(12) United States Patent
Numata et al.

(10) Patent No.: US 7,212,745 B2
(45) Date of Patent: May 1, 2007

(54) OPTICAL TRANSMISSION SYSTEM

(75) Inventors: Kazunori Numata, Neyagawa (JP);
Satoshi Furusawa, Osaka (JP);
Susumu Morikura, Yawata (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 847 days.

(21) Appl. No.: 09/988,706

(22) Filed: Nov. 20, 2001

(65) Prior Publication Data
US 2002/0105704 A1    Aug. 8, 2002

(30) Foreign Application Priority Data
Nov. 30, 2000    (JP) ............................ 2000-365439

(51) Int. Cl.
*H04B 10/00*   (2006.01)
*H04B 10/12*   (2006.01)

(52) U.S. Cl. ..................... 398/156; 398/141; 398/139

(58) Field of Classification Search ............... 398/140, 398/141, 156, 201, 202, 207, 139, 136; 385/117, 385/124, 33, 92, 27, 28, 29, 31, 32, 39, 52
See application file for complete search history.

(56) References Cited

U.S. PATENT DOCUMENTS

| | | | |
|---|---|---|---|
| 3,777,150 A | | 12/1973 | Miller |
| 3,780,295 A | | 12/1973 | Kapron et al. |
| 3,980,392 A | * | 9/1976 | Auracher ................ 385/43 |
| 4,050,782 A | | 9/1977 | Uchida et al. |
| 4,637,683 A | * | 1/1987 | Asawa ................ 356/138 |
| 4,709,413 A | * | 11/1987 | Forrest et al. ............. 398/139 |
| 4,732,448 A | | 3/1988 | Goldenberg |
| 4,807,954 A | * | 2/1989 | Oyamada et al. ............ 385/43 |
| 4,815,807 A | * | 3/1989 | Kaneko et al. ............. 385/33 |
| 5,370,643 A | * | 12/1994 | Krivoshlykov et al. ..... 385/117 |
| 5,699,464 A | * | 12/1997 | Marcuse et al. ............ 385/33 |
| 5,963,349 A | * | 10/1999 | Norte ............................ 398/42 |
| 6,064,786 A | | 5/2000 | Cunningham et al. |
| 6,243,508 B1 | * | 6/2001 | Jewell et al. ................ 385/14 |
| 6,304,352 B1 | * | 10/2001 | Cunningham et al. ...... 398/139 |
| 6,516,116 B1 | * | 2/2003 | Murray et al. ............... 385/31 |

FOREIGN PATENT DOCUMENTS

DE    25 17 019    10/1976

(Continued)

OTHER PUBLICATIONS

Douglas P. Karim, "Multimode dispersion in step-index polymer optical fibers", SPIE vol. 1799, pp. 57-66, 1992.

*Primary Examiner*—Dalzid Singh
(74) *Attorney, Agent, or Firm*—Wenderoth, Lind & Ponack, L.L.P.

(57) ABSTRACT

In an optical transmission system, a lens converges an optical signal outputted from a light emission element. The optical signal having passed through the lens enters a multi-mode fiber (MMF). A vertex of the lens and an input plane of the MMF are at a distance. The distance is set to a value which is not equal to the distance from the vertex to a focal point of the lens. As a result, a lowcost optical transmission system can be provided in which the influence of mode dispersion is reduced.

11 Claims, 13 Drawing Sheets

FOREIGN PATENT DOCUMENTS

| | | |
|---|---|---|
| DE | 39 16 813 | 11/1990 |
| EP | 0 301 841 | 2/1989 |
| EP | 1 001 292 | 5/2000 |
| JP | 08-122586 | 5/1996 |
| JP | 11-014869 | 1/1999 |
| WO | 99/66354 | 12/1999 |

* cited by examiner

OPTICAL TRANSMISSION SYSTEM

BACKGROUND OF THE INVENTION

1. Field of the Invention

The present invention relates to an optical transmission system, and more particularly to a system for transmitting an optical signal from a transmitter to a receiver through a multi-mode fiber.

2. Description of the Background Art

The development in technologies in recent years has produced optical fibers which satisfy broadband requirements as well as low loss requirements. As a result, optical fibers are being introduced in the backbone systems for interconnecting exchange systems on a network (e.g., the Internet).Optical fibers are considered promising for future applications in access systems for interconnecting exchanges with households, and also applications in home networks.

Optical fibers can be generally classified in two types based on their characteristics: single mode fibers (hereinafter referred to as "SMFs ") and multi-mode fibers (hereinafter referred to as "MMFs ").In a SMF, both the core and the cladding are made of silica ($SiO_2$). A SMF has a core diameter as small as about 10 μm. Furthermore, a SMF features a broad transmission bandwidth because it only allows a particular mode to be propagated therethrough. Therefore, SMFs have mainly enjoyed developments for long-distance and broadband transmission purposes in the backbone systems, and have gained wide prevalence there.

On the other hand, a MMF has a core diameter of 50μm to 1 mm, which is greater than the core diameter of a SMF. MMFs can be classified in several types based on the materials of the core and cladding. MMFs whose core and cladding are both made of silica are called GOFs (Glass Optical Fibers). MMFs whose core is made of silica, and whose cladding is made of a polymer, are called PCFs (Polymer Clad Fibers). MMFs whose core and cladding are both plastic are called POFs (Plastic Optical Fibers).

AMMF has a plurality of propagation modes (i.e., optical paths). FIG. 12 is a schematic diagram illustrating a plurality of propagation modes. In FIG. 12, a MMF 73 has a core 71 and a cladding 72. The entirety of light travels through the core 71 while being repeatedly reflected at the boundary $F_{bd}$ between the core 71 and the cladding 72 (TIR: Total Internal Reflection). Therefore, modes which are closer to being parallel to the boundary $F_{bd}$ will travel longer distances over the fiber axis between one reflection and the next reflection. Such modes (denoted by dot-dash lines) are referred to as lower-order modes ($M_{LO}$). On the other hand, modes which travel shorter distances over the fiber axis between one reflection and the next reflection (denoted by double-dot-dash lines) are referred to as higher-order modes ($M_{HI}$) A higher-order mode $M_{HI}$ constitutes a relatively large angle with respect to the fiber axis. Therefore, given a fixed length of the MMF 73, a higher-order mode $M_{HI}$ will experience a larger number of reflections at the boundary $F_{bd}$ than a lower-order mode $M_{LO}$, thus presenting an optical path which is different from that of the lower-order mode $M_{LO}$ ("optical path difference"). Due to optical path differences, different modes require different amounts of time to travel from an input plane to an output plane of the MMF 73.

An optical signal is transmitted through an optical fiber in the form of a pulse sequence. Since each mode in the optical signal has its own inherent propagation speed, a pulse sequence which is contained in a lower-order mode $M_{LO}$ (which has a relatively short propagation time) and the same pulse sequence which is contained in a higher-order mode $M_{HI}$ (which has a relatively long propagation time) will arrive at the receiving end at different times, although directed to the same information. As a result, the receiving end of the information may not be able to correctly receive the signal. This phenomenon, known as mode dispersion, is a factor which considerably constrains the transmission bandwidth of a MMF as compared to that of a SMF.

A transmission bandwidth of an optical fiber is usually represented as a product of a data rate for optical signals transmitted therethrough and a transmission distance (e.g., Mbps×km). The transmission distance must be decreased as the data rate is increased. In order to increase the transmission distance, the data rate must be lowered. The influence of mode dispersion also becomes more significant as the data rate is increased, or as the transmission distance is increased. Therefore, conventional optical transmission systems employing MMFs have a problem in that the transmission distance must be compromised in order to obtain a necessary data rate.

However, MMFs are less expensive than SMFs. Therefore, on the bare comparison, an optical transmission system employing MMFs should be able to be constructed inexpensively as compared to a system employing SMFs. Moreover, since the core diameter of a MMF is greater than that of a SMF, it is relatively easy to align the axes of two MMFs with each other. This helps relaxing the mounting precision of a connector for interconnecting MMFs. Thus, MMFs can greatly contribute to the construction of a low-cost optical transmission system. Therefore, MMFs are preferred for optical transmission over a distance which is short enough for the mode dispersion effects to be negligible.

In order to take advantage of the aforementioned features of MMFs, a number of techniques for reducing the influence of mode dispersion in MMFs and for improving the transmission bandwidth of an optical transmission system have been proposed. With reference to FIGS. 13 and 14, a technique disclosed in Japanese Patent Laid-Open Publication No. 10-227935 will be described. FIG. 13 is a block diagram illustrating the overall structure of a conventional optical transmission system $S_{cv}$. As shown in FIG. 13, the optical transmission system $S_{cv}$ includes a light source 82 having a lens 81, a MMF 83, a mode separator 84, and a receiver 85. FIG. 14 is a schematic diagram illustrating the optical coupling between the lens 81 and the MMF 83 shown in FIG. 13. As shown in FIG. 14, the lens 81 and the MMF 83 are disposed so as to attain a maximum coupling efficiency. Specifically, the MMF 83 is affixed in such a manner that an optical axis $A_{lz}$ (denoted by a dot-dash line) of the lens 81 and a fiber axis $A_{fr}$ (denoted by a double-dot-dash line) of the MMF 83 are on a single straight line, and that an intersection between an input plane $F_{in}$ (i.e., one of the end faces of the MMF 83) and the fiber axis $A_{fr}$ coincides with a focal point $Z_{fp}$ of the lens 81.

In the above-described optical transmission system $S_{cv}$, an optical signal from the lens 81 is focused on the input plane $F_{in}$ of the MMF 83, and therefore efficiently enters the MMF 83 with small coupling losses. Thereafter, the optical signal suffers increasingly more influence of mode dispersion as it is propagated through the core of the MMF 83. As a result, an optical signal having a plurality of modes associated with different propagation delay amounts goes out at an output plane $F_{out}$ of the MMF 83 (i.e., the end opposite to the input plane $F_{in}$). The optical signal outputted from the MMF 83 enters the mode separator 84, where only the necessary mode(s) is selected. Thereafter, the receiver 85 receives the optical signal which has been subjected to the selection at the mode separator 84. Thus, the receiver 85 is allowed to receive an optical signal with a reduced influence of mode dispersion, whereby the transmission bandwidth of MMF 83 is improved.

However, the mode separator 84, which is essentially an optical system comprising a number of lenses and mirrors, may be expensive. Moreover, the use of such an optical system complicates the overall structure of the optical transmission system $S_{cv}$. Furthermore, the optical axis alignment between components of the mode separator 84 requires high precision. This presents a problem because it takes considerable cost to construct and maintain the conventional optical transmission system $S_{cv}$.

There is an additional problem in that it is difficult to improve the mode selection efficiency of the mode separator 84. As used herein, the "mode selection efficiency" is a ratio of the output power to the input power of the mode separator 84 for a given mode. If the mode selection efficiency is poor, the input power for the receiver 85 is diminished, so that it may become necessary to enhance the power of the optical signal originating from the light source 82 and/or the photodetection sensitivity of the receiver 85, or to provide an optical amplifier subsequent to the mode separator 84, leading to increased cost for constructing and maintaining the conventional optical transmission system $S_{cv}$.

SUMMARY OF THE INVENTION

Therefore, an object of the present invention is to provide a low-cost optical transmission system employing multi-mode fibers which can minimize the influence of mode dispersion.

The present invention has the following features to attain the object above.

The present invention is directed to an optical transmission system for transmitting an optical signal from a transmitter to a receiver through a multi-mode fiber. The transmitter comprises: a light emission element for generating an optical signal, and at least one lens for converging the optical signal generated by the light emission element to focus at a focal point. The optical signal converged by the at least one lens enters an input plane of the multi-mode fiber to propagate through the multi-mode fiber. The receiver comprises a light receiving element for receiving the optical signal outputted from the multi-mode fiber. The input plane is placed at a position other than the focal point.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
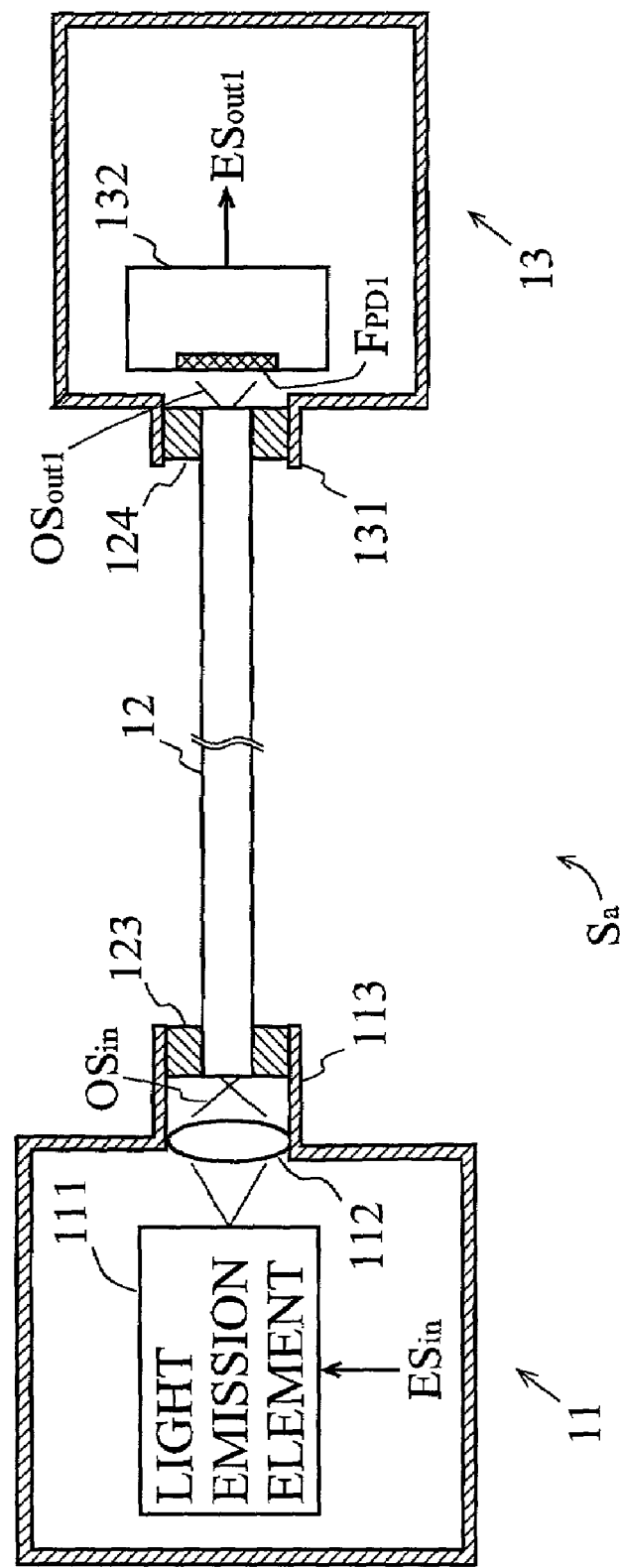
FIG. 1 is a block diagram illustrating the overall structure of an optical transmission system $S_a$ according to a first embodiment of the present invention.
Figure 2:
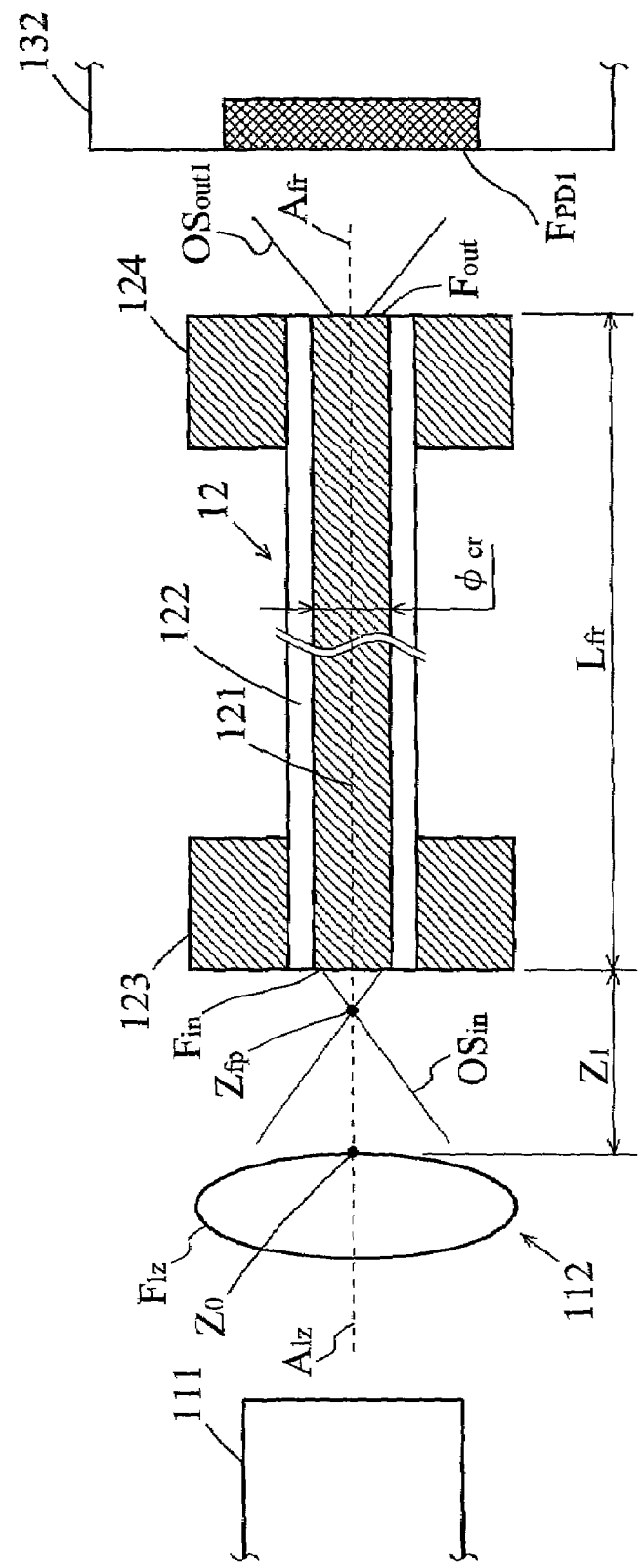
FIG. 2 is a schematic diagram illustrating optical coupling in the optical transmission system $S_a$ shown in FIG. 1.

FIG. 1 is a block diagram illustrating the overall structure of an optical transmission system $S_a$ according to a first embodiment of the present invention. FIG. 2 is a schematic diagram illustrating optical coupling in the optical transmission system $S_a$ shown in FIG. 1. The optical transmission system $S_a$ includes a transmitter 11, a multi-mode fiber (MMF) 12, and a receiver 13.

As shown in FIG. 1, the transmitter 11 includes a light emission element 111, at least one lens 112, and a receptacle 113. The light emission element 111, which typically comprises a laser diode or a light-emitting diode, is driven by an input electrical signal $ES_{in}$ to generate an optical signal $OS_{in}$. The lens 112, whose optical axis is aligned with that of the light emission element 111, allows the optical signal $OS_{in}$ generated by the light emission element 111 to pass therethrough. As shown in FIG. 2, in the present embodiment, a vertex $Z_0$ of the lens 112 is defined as the one of the two intersections between the optical axis $A_{lz}$ and the surface $F_{lz}$ of the lens 112 which is located farther away from the light emission element 111. A focal point $Z_{fp}$ of the lens 112 is defined as a position along the optical axis $A_{lz}$ where the optical signal $OS_{in}$, which has passed through the lens 112, focuses. The receptacle 113 shown in FIG. 1 will be described later.

In FIG. 1, the MMF 12 is a glass fiber of a graded index type, a polymer cladding fiber, or a plastic optical fiber. As shown in FIG. 2, the MMF 12 includes a core 121 and a cladding 122. A connector plug 123 is affixed to one end of the MMF 12 around the outer periphery thereof. The connector plug 123 is fitted into the receptacle 113 of the transmitter 11. As a result, as shown in FIG. 2, the fiber axis $A_{fr}$ of the MMF 12 and the optical axis $A_{lz}$ of the lens 112 are aligned with each other, and one of the end faces of the core 121 (hereinafter referred to as an "input plane $F_{in}$") is positioned at a predetermined distance $Z_1$ from the vertex $Z_0$ of the lens 112 along the fiber axis $A_{fr}$. The distance $Z_1$ is set at a value which is not equal to the distance from the vertex $Z_0$ to the focal point $Z_{fp}$, and preferably set at a value greater than the distance from the vertex $Z_0$ to the focal point $Z_{fp}$.

As shown in FIG. 2, a connector plug 124 is affixed to the other end of the core 121 around the outer periphery thereof. The optical signal $OS_{in}$ which has passed through the lens 112 enters the input plane $F_{in}$ of the MMF 12 having the above-described structure. As described in more detail later, since the input plane $F_{in}$ is at the distance $Z_1$ from the vertex $Z_0$, the optical signal $OS_{in}$ entering the input plane $F_{in}$ is propagated through the core 121 without being substantially affected by the influence of mode dispersion, so as to go out from the other end (hereinafter referred to as the "output plane $F_{out}$") of the core 121 as an optical signal $OS_{out1}$.

Referring back to FIG. 1, the receiver 13 includes a receptacle 131 and a light receiving element 132. The connector plug 124 affixed to the MMF 12 is fitted into the receptacle 131, thereby connecting the receiver 13 to the MMF 12. The light receiving element 132, which preferably comprises a Si PIN photodiode (hereinafter referred to as a "Si PIN PD"), has a face (hereinafter referred to as the "light-receiving plane $F_{PD1}$") at which the optical signal $OS_{out1}$ outputted from the MMF 12 enters. The light-receiving plane $F_{PD1}$ has an area nearly equal to or greater than the output plane $F_{out}$. When the receiver 13 is connected to the MMF 12, the light-receiving plane $F_{PD1}$ is positioned so as to oppose the output plane $F_{out}$ of the MMF 42 in a parallel orientation. The light receiving element 132 having the above-described structure converts the optical signal $OS_{out1}$ entering the light-receiving plane $F_{PD1}$ into an electrical signal $ES_{out1}$ which represents the same information as that represented by the electrical signal $ES_{in}$.

The reason why a Si PIN PD is preferably used as the light receiving element 132 is that a Si PIN PD generally has a large light-receiving plane $F_{PD1}$. However, the light receiving element 132 may be composed of a photodiode other than a Si PIN PD because the size of the light-receiving plane $F_{PD1}$ is not essential to the present embodiment.

Next, the distance $Z_1$, which is employed in a characteristic manner in the present embodiment, will be described. In order to determine the distance $Z_1$, the applicant performed an experiment as follows by using the above-described optical transmission system $S_a$. The experiment was carried out under the following conditions: As the light emission element 111, a light emission element capable of emitting light having a power of 1.8 mW when a DC current of 30 mA is injected thereto was employed. Two PCFs (Polymer Clad Fibers) having respectively different lengths were prepared as MMFs 12 in order to enable experiments for short-distance transmission and long-distance transmission. More specifically, the MMF 12 for short-distance transmission had a length $L_{fr}$ of 2.0 m, and the MMF 12 for long-distance transmission had a length $L_{fr}$ of 100 m. The core 121 of each MMF 12 was composed of silica ($SiO_2$), and had a diameter (hereinafter referred to as the "core diameter") $\phi_{cr}$ (see FIG. 2) of 200 μm. The cladding 122 was composed of a polymer such as a methacrylic resin (PMMA) with a diameter of 230 μm.

Figure 3:
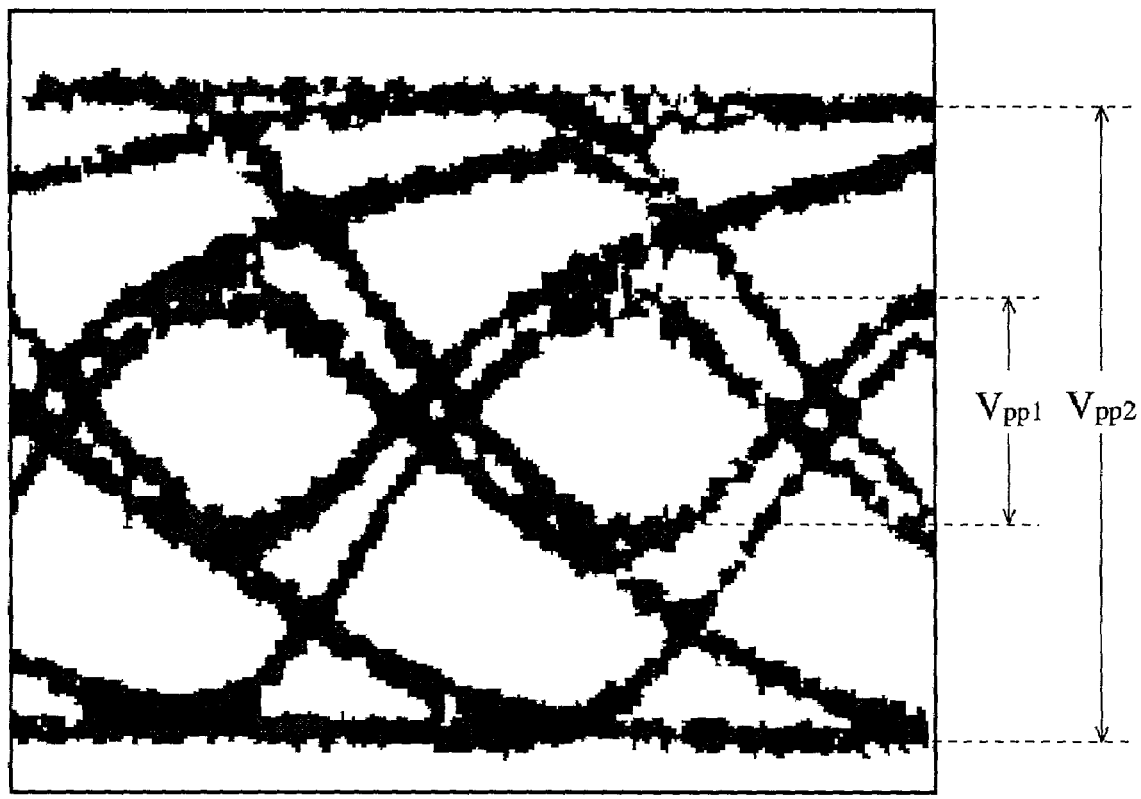
FIG. 3 is a schematic diagram showing an eye pattern of an optical signal $OS_{out1}$ shown in FIG. 1.

Next, an eye opening factor R and an output power P, which were the subjects of measurement under the experiment conducted by the applicant, will be described. FIG. 3 is a schematic diagram showing an eye pattern of the optical signal $OS_{out1}$ of the MMF 12. The eye opening factor R is defined as a ratio of a minimum value $V_{pp1}$ to a maximum value $V_{pp2}$ of amplitude of the eye pattern as shown in FIG. 3, or $V_{pp1}/V_{pp2}$. From the eye opening factor R as defined above, a transmission bandwidth of the optical transmission system $S_a$ can be determined. The output power P is a light power of the optical signal $OS_{out1}$ from the MMF 12.

Figure 4:
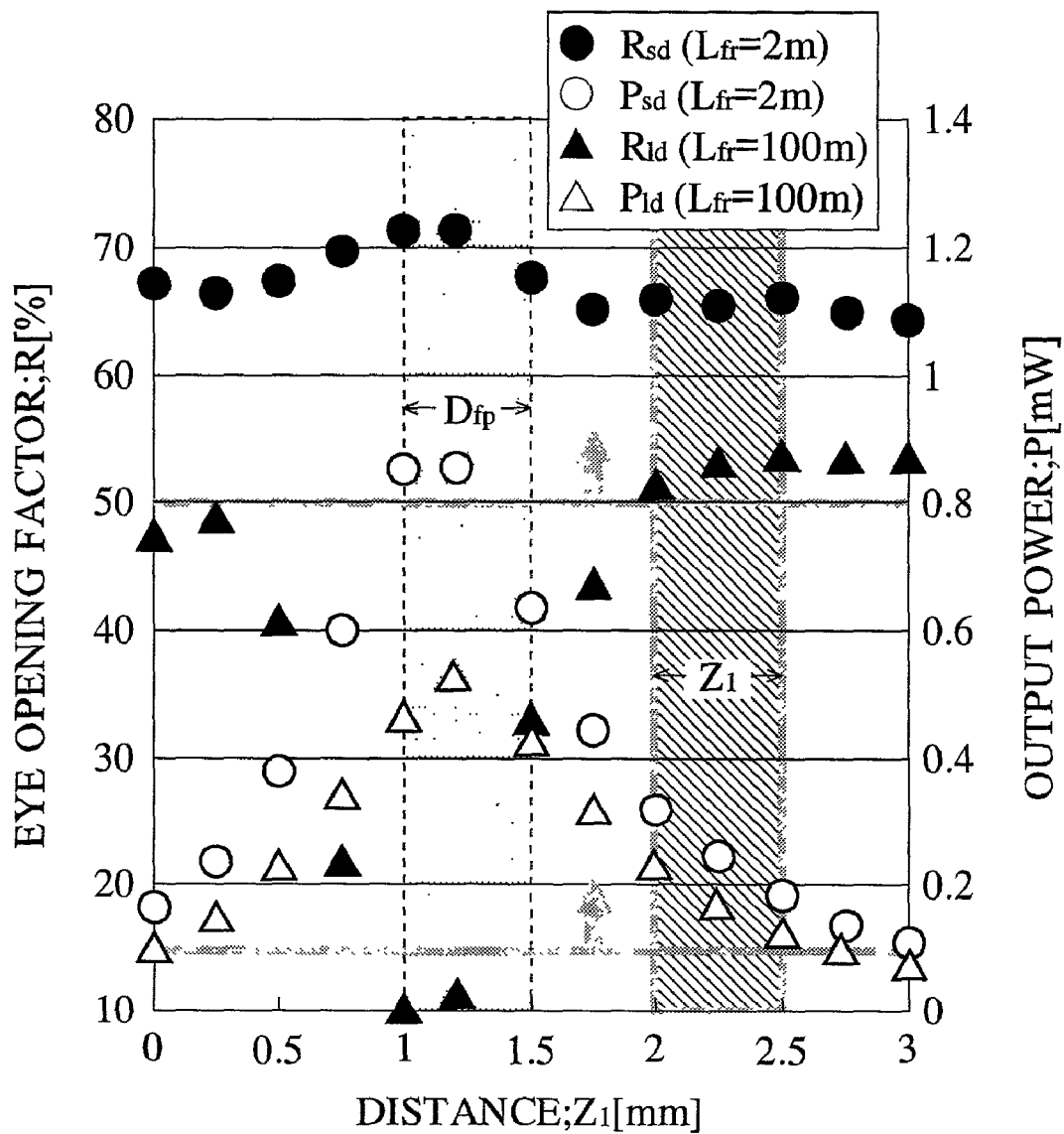
FIG. 4 is a graph showing the eye opening factor R and the output power P of the optical signal $Os_{out1}$ relative to the distance $Z_1$ shown in FIG. 2.

Under the above experimental conditions, the applicant measured the characteristics of the eye opening factor R and the output power P with respect to the position $Z_1$ of the input plane $F_{in}$, by means of measurement devices such as a power meter. As a result, measurement results as shown in FIG. 4 were obtained. In FIG. 4, the horizontal axis $Z_1$, which is identical to the optical axis $A_{1z}$ described above, represents distance to the input plane $F_{in}$ as taken from the position of the vertex $Z_0$ of the lens 112. Herein, the position of the vertex $Z_0$ of the lens 112 is defined as $Z_1=0$. In other words, FIG. 4 shows the manner in which the eye opening factor R and the output power P change as the input plane $F_{in}$ of the MMF 12 is gradually pulled away from the vertex $Z_0$ along the optical axis $A_{1z}$ (i.e., the "$Z_1$" axis).

More specifically, FIG. 4 shows the eye opening factor R (hereinafter referred to as the "eye opening factor $R_{sd}$"; shown by "●" symbols) and the output power P (hereinafter referred to as the "output power $P_{sd}$"; shown by "○" symbols") of the optical signal $OS_{out1}$ when the length $L_{fr}$ of the MMF 12 is 2 m. FIG. 4 also shows the eye opening factor R (hereinafter referred to as the "eye opening factor $R_{1d}$"; shown by "▲" symbols) and the output power P (hereinafter referred to as the "output power $P_{1d}$"; shown by "Δ" symbols") of the optical signal $OS_{out1}$ when the length $L_{fr}$ is 100 m.

Since the maximum values of the output power $P_{sd}$ and $P_{1d}$ are both observed when $Z_1$ is in the range from 1.0 mm to 1.5 mm, it can be seen that the optical signal $OS_{in}$ having passed through the lens 112 is focused at a focal point $Z_{fp}$ which is in this range. In this sense, the range of $Z_1$ from 1.0 mm to 1.5 mm will be referred to as a "focal range" $D_{fp}$ (see regions hatched with dots in FIG. 4) Note, however, that the eye opening factor $R_{1d}$ is considerably deteriorated in the focal range $D_{fp}$. The eye pattern (FIG. 3) of the optical signal $OS_{out1}$ having such a deteriorated eye opening factor $R_{1d}$ reveals a significant difference between the minimum value $V_{pp1}$ and the maximum value $V_{pp2}$ in amplitude. This indicates that it is difficult to transmit the optical signal $OS_{in}$ over a long distance (e.g., 100 m) when the input plane $F_{in}$ of the MMF 12 is set within the focal range $D_{fp}$.

On the other hand, in FIG. 4, the eye opening factor $R_{sd}$ is substantially constant regardless of the value of $Z_1$, unlike the eye opening factor $R_{1d}$. Such differences in the characteristics of the eye opening factor R indicates the facts that the influence of mode dispersion varies depending on the value of $Z_1$ and that the influence of mode dispersion becomes more outstanding as the transmission distance of the optical signal $OS_{in}$ increases.

Figure 14:
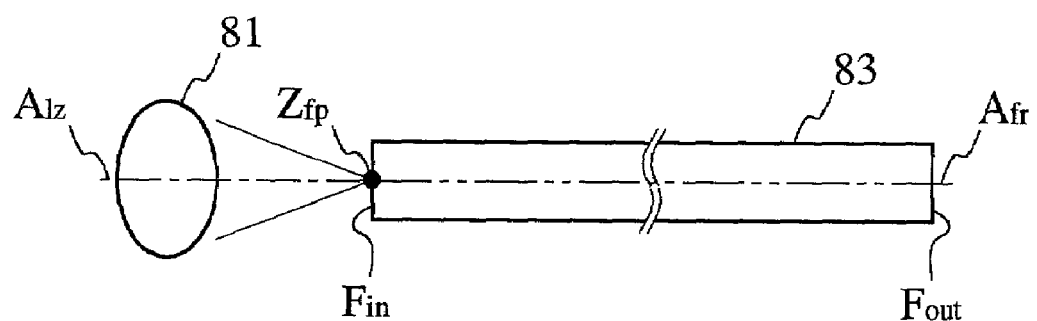
FIG. 14 is a schematic diagram illustrating optical coupling between a light source 82 and a multi-mode fiber 83 shown in FIG. 13.

Referring back to FIG. 14, in the conventional optical transmission system $S_{cv}$, the input plane $F_{in}$ of the MMF 83 is positioned at the focal point $Z_{fp}$ so as to maximize the coupling efficiency with the MMF 83 (i.e., so as to allow the optical signal to enter the MMF 83 with minimum coupling losses). However, it should now be clear from the characteristic curves shown in FIG. 4 that, when the input plane $F_{in}$ is positioned at the focal point $Z_{fp}$, the optical signal $OS_{in}$ suffers severer influence of mode dispersion as the MMF 12 becomes longer. This indicates that, in the conventional optical transmission system $S_{cv}$, the transmission bandwidth is under the constraints imposed by mode dispersion.

The above findings can be theorized as follows. Prior to the following explanation, three parameters used therein, i.e., the numerical aperture (hereinafter "$NA_s$") of the transmitter 11, the numerical aperture (hereinafter "$NA_f$") of the MMF 12 and the numerical aperture (hereinafter "$NA_{in}$") of the optical signal $OS_{in}$ entering and propagated through the MMF 12, will be first described.

Figure 5:
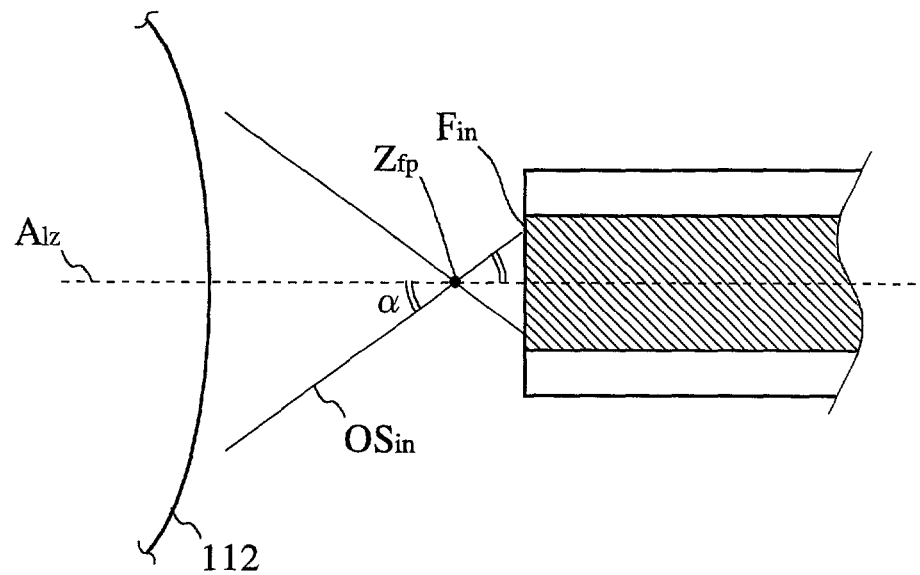
FIG. 5 is a schematic diagram illustrating a numerical aperture (=sinα) of a transmitter 11 shown in FIG. 1.

FIG. 5 is a schematic diagram illustrating the $NA_s$ of the transmitter 11 shown in FIG. 1. As shown in FIG. 5, the optical signal $OS_{in}$, which once focuses at the position $Z_{fp}$, propagates while spreading at an angle of α with respect to the optical axis $A_L$. The $NA_s$, which is a measure of such spread, can be expressed by equation (1) below:

$$NA_s = \sin\alpha \quad (1)$$

The value of $NA_s$ increases as the once-focused optical signal $OS_{in}$ has a greater expanse. The value of $NA_s$ is within the range $0 < NA_s \leq 1$.

In the light entering the MMF 12, the only components which propagate to the output plane $F_{out}$ are those within a certain range of angles (hereinafter referred to as the "propagation angles" of the MMF 12). Based on the largest propagation angle of the MMF 12, named $\beta_{max}$, the $NA_f$ can be expressed by equation (2) below:

$$NA_f = \sin\beta_{max} \quad (2)$$

Usually, the above-defined $NA_f$ is determined by the refractive indices of the core 121 and the cladding 122, and is a parameter which is independent of the aforementioned $NA_s$. If light having a numerical aperture greater than the $NA_f$ enters the input plane $F_{in}$, any components which spread outside the aforementioned range of propagation angles of the MMF 12 will be transmitted through to the exterior of the MMF 12. On the other hand, if the optical signal $OS_{in}$ has a numerical aperture smaller than the $NA_f$, then all components of the light will propagate through the core 121 as explained above. Moreover, since the optical signal $OS_{in}$ has a smaller numerical aperture than the $NA_f$ in this case, the higher-order modes in the optical signal $OS_{in}$ are decreased, so that the mode dispersion can be reduced.

Moreover, in the optical transmission system $S_a$, once the position $Z_1$ of the input plane $F_{in}$ is determined, only those components of the optical signal $OS_{in}$ having the $NA_s$ which are within a predetermined range of angles (which in the present embodiment are referred to as the "reachable angles", i.e. angles reachable to the MMF 12) can actually enter the input plane $F_{in}$. Any light components which lie outside the range of reachable angles, which do not enter the input plane $F_{in}$, will not be propagated through the core 121. Furthermore, due to the $NA_f$ of the MMF 12, all components of the optical signal $OS_{in}$ may not always be propagated to the output plane $F_{out}$ even if it enters the input plane $F_{in}$. Assuming that the components of the optical signal $OS_{in}$ which enter the input plane $F_{in}$ and which are propagated through the MMF 12 to the output plane $F_{out}$ have a largest incident angle of $\beta_{th}$, the aforementioned $NA_{in}$ can be expressed by equation (3) below:

$$NA_{in} = \sin\beta_{th} \quad (3)$$

In general, mode dispersion is more reduced as the $NA_{in}$ expressed by equation (3) decreases.

Figure 6:
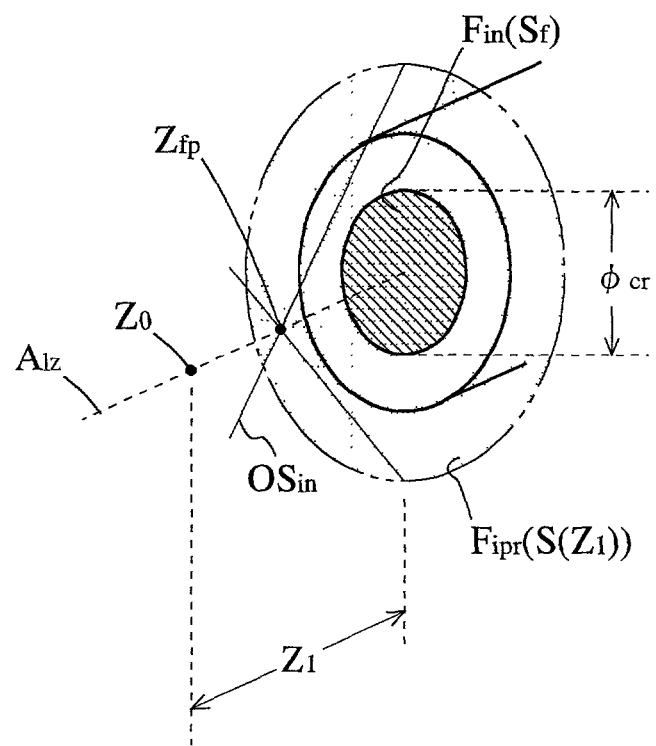
FIG. 6 is a schematic diagram illustrating an incident light propagation plane $F_{ipr}$.

FIG. 6 is a schematic diagram illustrating an incident light propagation plane $F_{ipr}$ (defined below), which helps detailed explanation of the $NA_{in}$. In the following description, it is assumed that the input plane $F_{in}$ (shown hatched with oblique lines in FIG. 6) has an area $S_f$; the input plane $F_{in}$ has a diameter (i.e., core diameter) $\phi_{cr}$ as shown in FIG. 2; and the incident light propagation plane $F_{ipr}$ (shown hatched with dots in FIG. 6) has an area $S(Z_1)$. First, a geometric definition of the incident light propagation plane $F_{ipr}$ will be given. The optical signal $OS_{in}$ which has passed through the lens 112 (not shown) converges until reaching the focal point $Z_{fp}$, and thereafter diverges in a conical shape. When one draws an imaginary plane at a distance of $Z_1$ from the vertex $Z_0$, such that the imaginary plane is perpendicular to the optical axis $A_L$, the incident light propagation plane $F_{ipr}$ is defined as a cross-section of the optical signal $OS_{in}$ taken at the imaginary plane. As will be clear from FIG. 6, the ratio of the area $S(Z_1)$ to the area $S_f$ changes depending on the position $Z_1$ of the input plane $F_{in}$. Thus, it is possible to adjust the $NA_{in}$ by changing the position $Z_1$ of the input plane $F_{in}$; in other words, the $NA_{in}$ is a function of $Z_1$, and can be expressed as $NA_{in}(Z_1)$. Thus, by changing the position $Z_1$ of the input plane $F_{in}$, it is possible to control the mode dispersion, which affects the transmission distance and the data rate of the optical signal $OS_{in}$.

First, the case in which the $NA_s$ is equal to or less than the $NA_f$ will be considered. In this case, all of the components of the optical signal $OS_{in}$ which have passed through the lens 112 and which enters the core 121 are propagated to the output plane $F_{out}$. If $S(Z_1)$ is equal to or greater than $S_f$, $NA_{in}(Z_1)$ decreases as $Z_1$ increases, as expressed by equation (4) below:

$$NA_{in}(Z_1) = \sin\beta_{th} \quad (4)$$
$$= \sin\left(\left(\arctan\left(\frac{\phi_{cr}}{2 \cdot |Z_1 - Z_{fp}|}\right)\right)\right); S(Z_1) \geq S_f$$

On the other hand, if $S(Z_1)$ is smaller than $S_f$, all of the optical signal $OS_{in}$ which has passed through the lens 112 enters the input plane $F_{in}$, and is propagated to the output plane $F_{out}$. In this case, the $NA_{in}$ can be expressed by equation (5) below.

$$NA_{in}(Z_1) = \sin\beta_{th} = NA_s; S(Z_1) < S_f \quad (5)$$

Next, the case in which $NA_s$ is greater than $NA_f$ will be considered. In this case, even if all of the optical signal $OS_{in}$ which has passed through the lens 112 enters the input plane $F_{in}$, any components (modes) thereof which fall outside the $NA_f$ cannot be propagated through the core 121. Therefore, $NA_{in}(Z_1)$ is fixed such that $NA_{in}(Z_1) = NA_f$. However, as $Z_1$ increases therefrom so that $NA_{in}(Z_1) < NA_f$ is satisfied, thereafter $NA_{in}(Z_1)$ decreases with an increase in $Z_1$, as can be expressed by equation (6) below:

$$NA_{in}(Z_1) = \sin\beta_{th} \quad (6)$$
$$= \sin\left(\left(\arctan\left(\frac{\phi_{cr}}{2 \cdot |Z_1 - Z_{fp}|}\right)\right)\right) \leq NA_f$$

As described above, by adjusting the position $Z_1$, it is possible to reduce the $NA_{in}$ (i.e., $NA_{in}(Z_1)$). Thus, the influence of mode dispersion, which is a problem associated with a long-distance transmission of the optical signal $OS_{in}$, can be minimized.

In an actual implementation of the optical transmission system $S_a$, the determination of the position $Z_1$ must be made while considering both the output power P from the MMF 12 and the eye opening factor R as design requirements. The reason is that, as the influence of mode dispersion is reduced by increasing the value of $Z_1$, the coupling losses between the transmitter 11 and the MMF 12 increase, making it difficult to obtain the required output power P.

For example, let us assume that the three following design requirements are given in the optical transmission system $S_a$ shown in FIG. 1: MMF 12 has a length $L_f$ of 100 m; the output power P is equal to greater than 0.1 mW; and the eye opening factor R is equal to greater than 50%. Under this assumption, it can be seen from the eye opening factor $R_{1d}$ characteristics (represented by ▲) and the output power $P_{1d}$ characteristics (represented by △) shown in FIG. 4 that the value of $Z_1$ is preferably in the range from 2.0 mm to 2.5 mm (see the region hatched with oblique lines in FIG. 4). Note that a $Z_1$ value of at least 2.0 mm or more can be employed in order to simply reduce the influence of mode dispersion without considering any other design requirements. Thus, the present optical transmission system $S_a$ allows the influence of mode dispersion in the MMF 12 to be reduced based on the adjustment of the position $Z_1$, whereby the transmission bandwidth of the MMF 12 can be broadened. This eliminates the need for a mode separator 84 (see FIG. 13) in the optical transmission system $S_a$, unlike in the conventional optical transmission system $S_{cv}$. Thus, a low-cost optical transmission system $S_a$ can be provided according to the present embodiment of the invention.

Note that the value of $Z_1$ is not always limited to 2.0 mm or above, but may vary depending on design requirements such as the length $L_{fr}$ of the MMF 12, the output power P, and the eye opening factor R. In general, the influence of mode dispersion becomes more outstanding as the transmission distance (length $L_{fr}$) increases. Stated otherwise, the value of $Z_1$ decreases as the transmission distance decreases.

(Second Embodiment)

Figure 7:
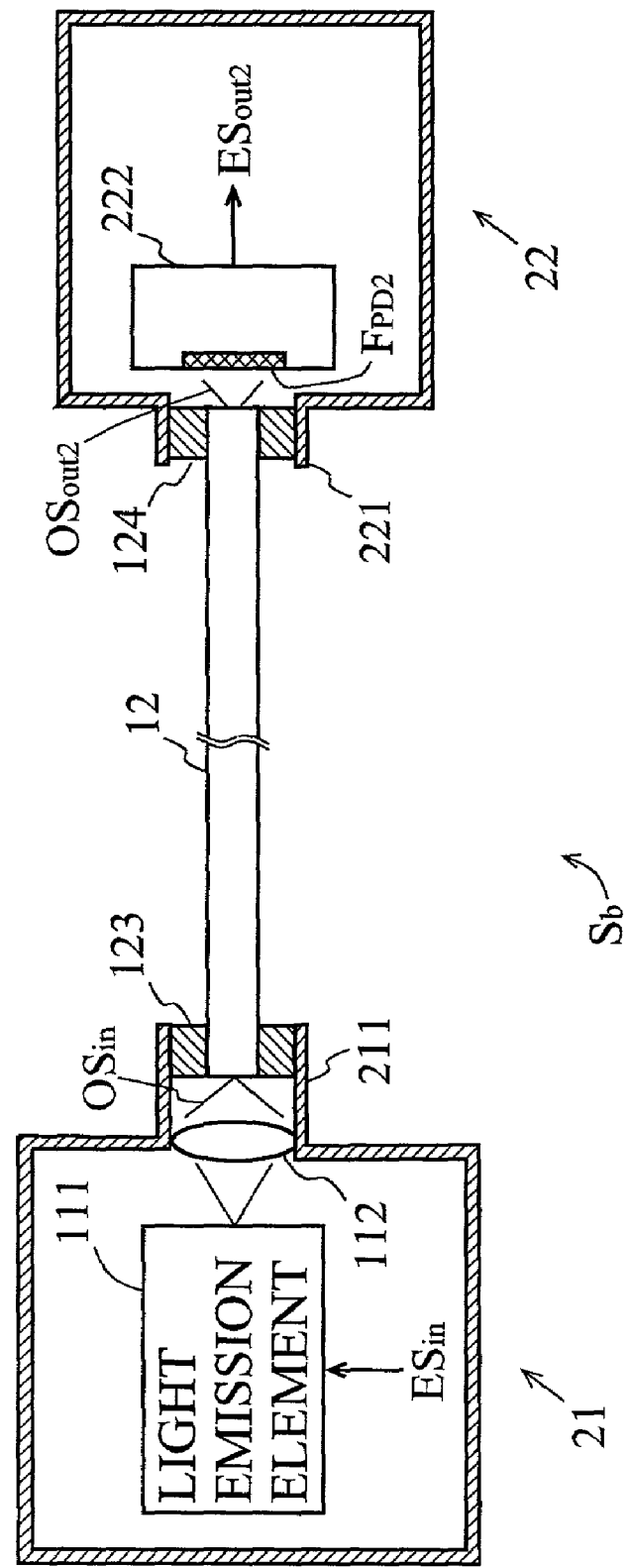
FIG. 7 is a block diagram illustrating the overall structure of an optical transmission system $S_b$ according to a second embodiment of the present invention.
Figure 8:
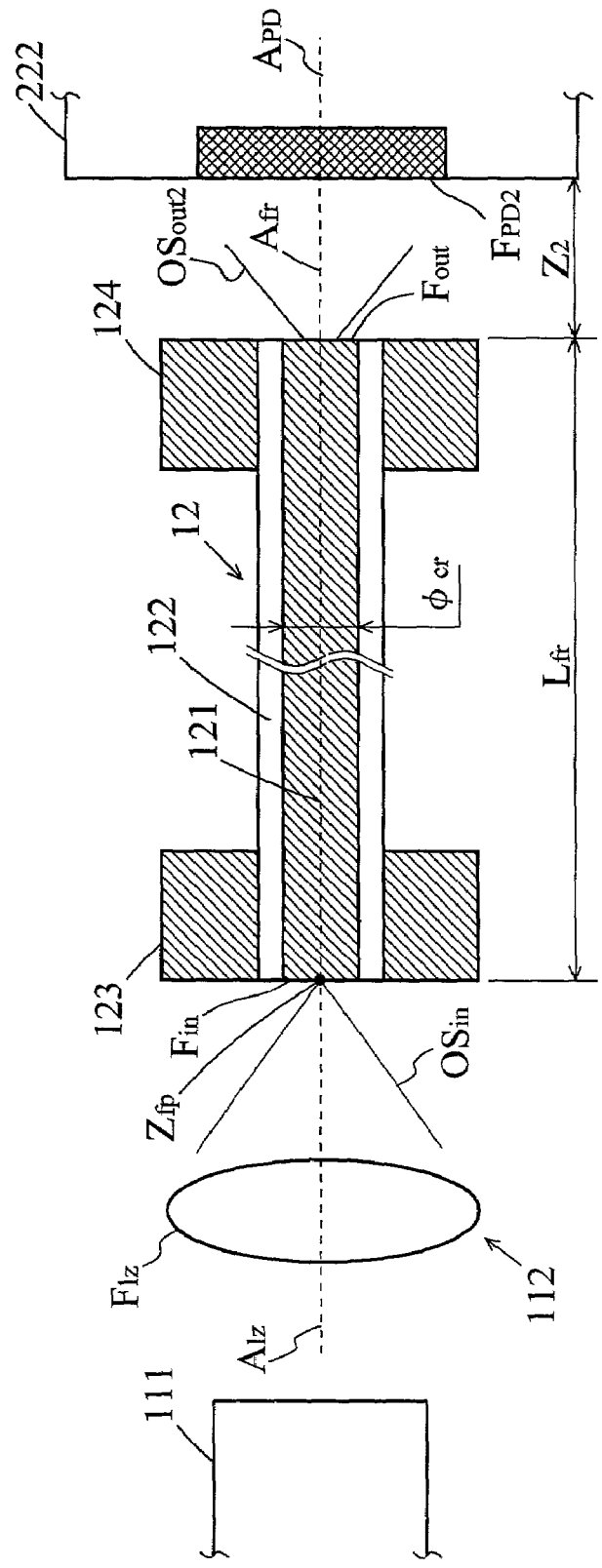
FIG. 8 is a schematic diagram illustrating optical coupling in the optical transmission system $S_b$ shown in FIG. 7.

FIG. 7 is a block diagram illustrating the overall structure of an optical transmission system $S_b$ according to a second embodiment of the present invention. FIG. 8 is a schematic diagram illustrating how optical coupling occurs in the optical transmission system $S_b$ shown in FIG. 7. The optical transmission system $S_b$ is identical to the optical transmission system $S_a$ except that the transmitter 11 and the receiver 13 are replaced by a transmitter 21 and a receiver 22. Accordingly, any component elements in the optical transmission system $S_b$ which find their counterparts in the optical transmission system $S_a$ will be denoted by the same reference numerals as those used in FIGS. 1 and 2, and the descriptions thereof are omitted.

With reference to FIG. 7, the transmitter 21 is identical to the transmitter 11 shown in FIG. 1 except that the receptacle 113 is replaced by a receptacle 211. Accordingly, any component elements in the transmitter 21 which find their counterparts in the transmitter 11 will be denoted by the same reference numerals as those used in FIG. 1, and the descriptions thereof are omitted. The connector plug 123 which is affixed to the input plane $F_{in}$ of the MMF 12 is fitted into the receptacle 211. As a result, as shown in FIG. 8, the fiber axis $A_{fr}$ of the MMF 12 and the optical axis $A_{lz}$ of the lens 112 are aligned with each other, and the input plane $F_{in}$ is positioned substantially at the focal point $Z_{fp}$ so as to maximize the coupling efficiency between the lens 112 and the MMF 12. In this aspect, the transmitter 21 is clearly distinct from the transmitter 11 shown in FIG. 1. Therefore, an optical signal $OS_{in}$ entering the input plane $F_{in}$ is propagated trough the core 121 while being affected by mode dispersion, so as to be outputted from the output plane $F_{out}$ as an optical signal $OS_{out2}$.

As shown in FIG. 7, the receiver 22 includes a receptacle 221 and a light receiving element 222. The connector plug 124 which is affixed to the MMF 12 is fitted into the receptacle 221. The light receiving element 222 which preferably comprises a Si PIN PD, has a face (hereinafter referred to as the "light-receiving plane $F_{PD2}$") at which the optical signal $OS_{out2}$ outputted from the MMF 12 enters. In the present embodiment, it is assumed that the light-receiving plane $F_{PD2}$ has a circular shape for the sake of explanation. As shown in FIG. 8, when the receiver 22 is connected to the MMF 12, the light-receiving plane $F_{PD2}$ having the above-described structure opposes the output plane $F_{out}$ of the MMF 12 in a parallel orientation, with a distance $Z_2$ therebetween. Furthermore, a central axis $A_{PD}$ of the light-receiving plane $F_{PD2}$ is aligned with the fiber axis $A_{fr}$. Thus, as shown in FIG. 7, the light receiving element 222 converts the optical signal $OS_{out2}$ entering the light-receiving plane $F_{PD2}$ into an electrical signal $ES_{out2}$ which represents the same information as that represented by the electrical signal $ES_{in}$.

As described above, according to the present embodiment, the input plane $F_{in}$ is positioned at the focal point $Z_{fp}$, so that the optical signal $OS_{in}$ entering the input plane $F_{in}$ suffers severer influence of mode dispersion than in the first embodiment. As a result, the respective modes in the optical signal $OS_{in}$ which simultaneously enter the input plane $F_{in}$ arrive at the output plane $F_{out}$ at respectively different times. Therefore, the outputted optical signal $OS_{out2}$ has a relatively "closed" eye pattern. When all modes in the outputted optical signal $OS_{out2}$ enter the light-receiving plane $F_{PD2}$, the receiver 22 cannot correctly receive the information which is represented by the electrical signal $ES_{in}$.

Figure 9:
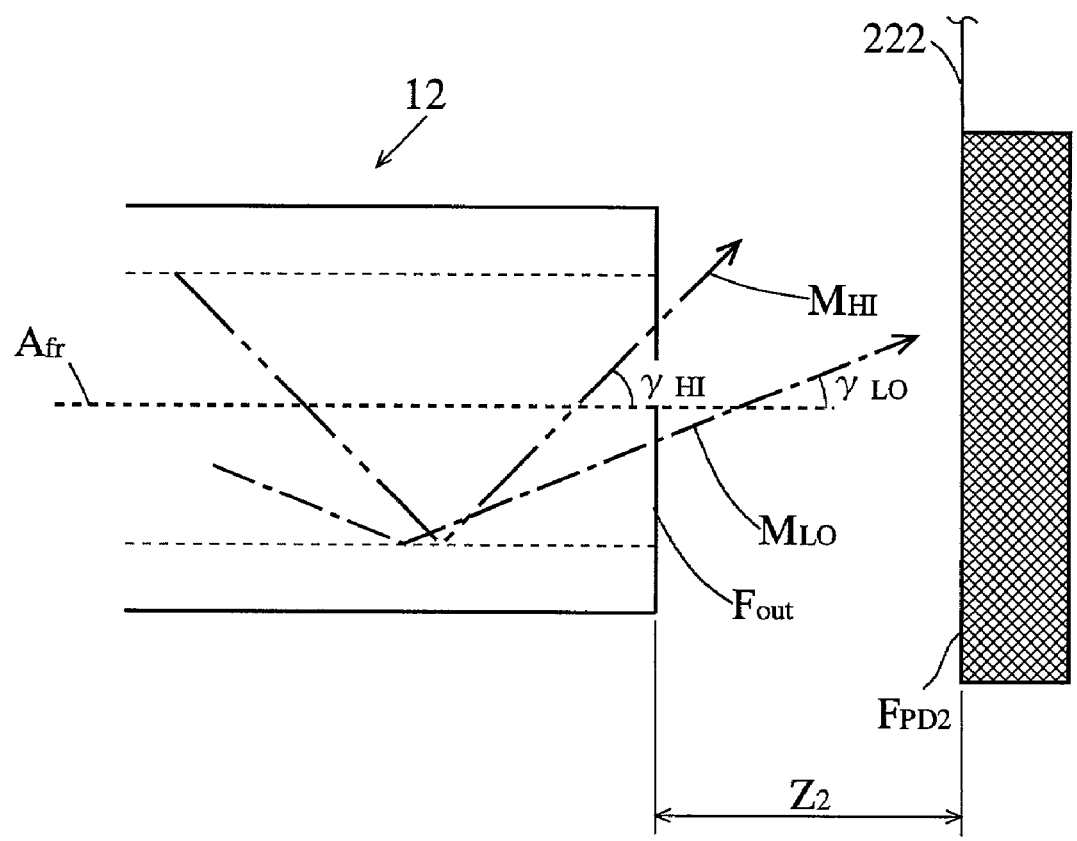
FIG. 9 is a schematic diagram illustrating a higher-order outgoing angle $\gamma_{HI}$ and a lower-order outgoing angle $\gamma_{LO}$.

FIG. 9 is a schematic diagram illustrating a higher-order outgoing angle $\gamma_{HI}$ of a higher-order mode $M_{HI}$ and a lower-order outgoing angle $\gamma_{LO}$ of a lower-order mode $M_{LO}$, both contained in the optical signal $OS_{out2}$ shown in FIG. 8. As shown in FIG. 9, the higher-order mode $M_{HI}$ and the lower-order mode $M_{LO}$ go out at respectively different angles, i.e., the higher-order outgoing angle $\gamma_{HI}$ and the lower-order outgoing angle $\gamma_{LO}$, with respect to the fiber axis $A_{fr}$. The lower-order outgoing angle $\gamma_{LO}$ is smaller than the higher-order outgoing angle $\gamma_{HI}$. Therefore, the higher-order mode $M_{HI}$ will travel farther away from the fiber axis $A_{fr}$ as the value of $Z_2$ increases. Accordingly, the value of $Z_2$ can be adjusted to prevent the higher-order mode $M_{HI}$ from entering the light-receiving plane $F_{PD}$, so that the light receiving element 222 will selectively receive only the lower-order mode $M_{LO}$.

The aforementioned selective reception can be explained as follows. First, the parameters employed in the following explanation, i.e., the outgoing numerical aperture (hereinafter referred to as "$NA_{out}$") of the MMF 12 and the numerical aperture (hereinafter referred to as "$NA_{PD}$") of the light-receiving plane $F_{PD2}$, will be described.

As seen above, modes with various outgoing angles go out from the output plane $F_{out}$ of the MMF 12. Based on the largest angle among such outgoing angles, named $\gamma_{max}$, the $NA_{out}$ can be expressed by equation (7) below:

$$NA_{out} = \sin\gamma_{max} \qquad (7)$$

Note that, since the input plane $F_{in}$ is positioned at the focal point $Z_{fp}$ in the present embodiment, the $NA_{out}$ is substantially the same value as the $NA_{in}$ ($Z_{fp}$) obtained from equations (4) to (6) above.

Moreover, in accordance with the optical transmission system $S_b$, once the position $Z_2$ is determined, only those modes in the outputted optical signal $OS_{out2}$ having the $NA_{out}$ which are within a predetermined range of angles (which in the present embodiment are referred to as the "reachable angles", i.e., angles reachable to the light-receiving plane $F_{PD2}$) can actually reach the light-receiving plane $F_{PD2}$. Assuming that the modes in the optical signal $OS_{out2}$ outputted from the output plane $F_{out}$ which enter the light-receiving plane $F_{PD2}$ have a largest outgoing angle of $\gamma_{th}$, the aforementioned $NA_{PD}$ can be expressed by equation (8) below:

$$NA_{PD} = \sin\gamma_{th} \qquad (8)$$

Figure 10:
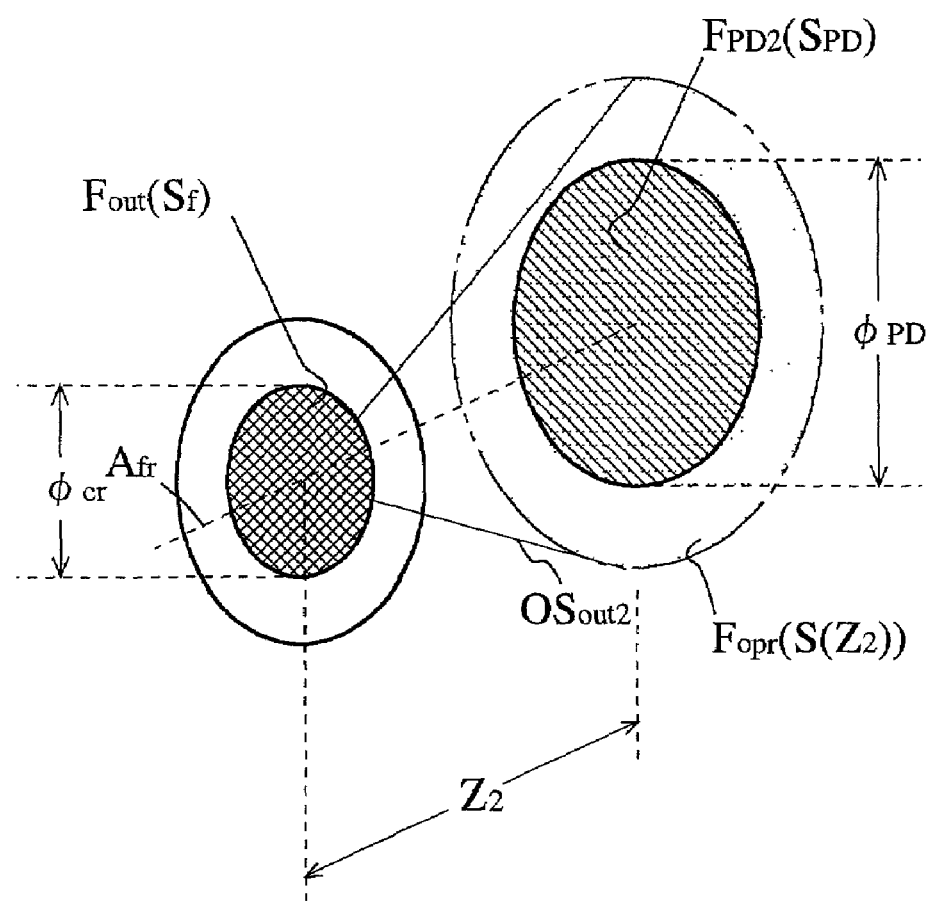
FIG. 10 is a schematic diagram illustrating an output light propagation plane $F_{opr}$.

FIG. 10 is a schematic diagram illustrating an output light propagation plane $F_{opr}$ (defined below), which helps detailed explanation of the $NA_{PD}$. In the following description, it is assumed that the output plane $F_{out}$ (shown cross-hatched in FIG. 10) has an area $S_f$; the output plane $F_{out}$ has a diameter (i.e., core diameter) $\phi_{cr}$; and the light-receiving plane $F_{PD2}$ (shown hatched with oblique lines in FIG. 10) has an area $S_{PD}$. The light-receiving plane $F_{PD2}$ is assumed to have a circular shape in the present embodiment. Under this assumption, it is further assumed that the light-receiving plane $F_{PD2}$ has a diameter $\phi_{PD}$. It is also assumed that the output light propagation plane $F_{opr}$ (shown hatched with dots in FIG. 10) has an area $S(Z_2)$. First, a geometric definition of the output light propagation plane $F_{opr}$ will be given. The optical signal $OS_{out2}$ outputted from the MMF 12 diverges in a radial manner. When one draws an imaginary plane at a distance of $Z_2$ from the output plane $F_{out}$, such that the imaginary plane is perpendicular to the optical axis $A_{lz}$, the output light propagation plane $F_{opr}$ is defined as a cross-section of the aforementioned outputted optical signal $OS_{out2}$ taken at the imaginary plane. It is possible to adjust the largest outgoing angle $\gamma_{th}$, and hence the $NA_{PD}$, by changing the position $Z_2$ of the output plane $F_{out}$; in other words, the $NA_{PD}$ is a function of $Z_2$, and can be expressed as $NA_{PD}(Z_2)$. Thus, by changing the distance $Z_2$ of the light-receiving plane $F_{PD}$ from the output plane $F_{out}$, it can be ensured that the light receiving element 222 selectively receives only the lower-order mode $M_{LO}$ (shown in FIG. 9) while avoiding the higher-order mode $M_{HI}$, which would cause the outgoing optical signal $OS_{out2}$ to have a relatively closed eye pattern. As a result, the light receiving element 222 can generate the electrical signal $ES_{out2}$ representing the same information as that represented by the electrical signal $ES_{in}$.

The $NA_{PD}(Z_2)$ will be described in more detail. First, the case where $S(Z_2)$ is greater than SPD will be considered. In this case, $NA_{PD}(Z_2)$ decreases as the value of $Z_2$ increases, as expressed by equation (9) below:

$$NA_{PD}(Z_2) = \sin\gamma_{th}$$

$$NA_{PD}(Z_2) = \sin\gamma_{th} \quad (9)$$
$$= \sin\left(\left(\arctan\left(\frac{\phi_{PD} - \phi_{cr}}{2 \cdot Z_2}\right)\right)\right); S(Z_2) \geq S_{PD}$$

Figure 13:
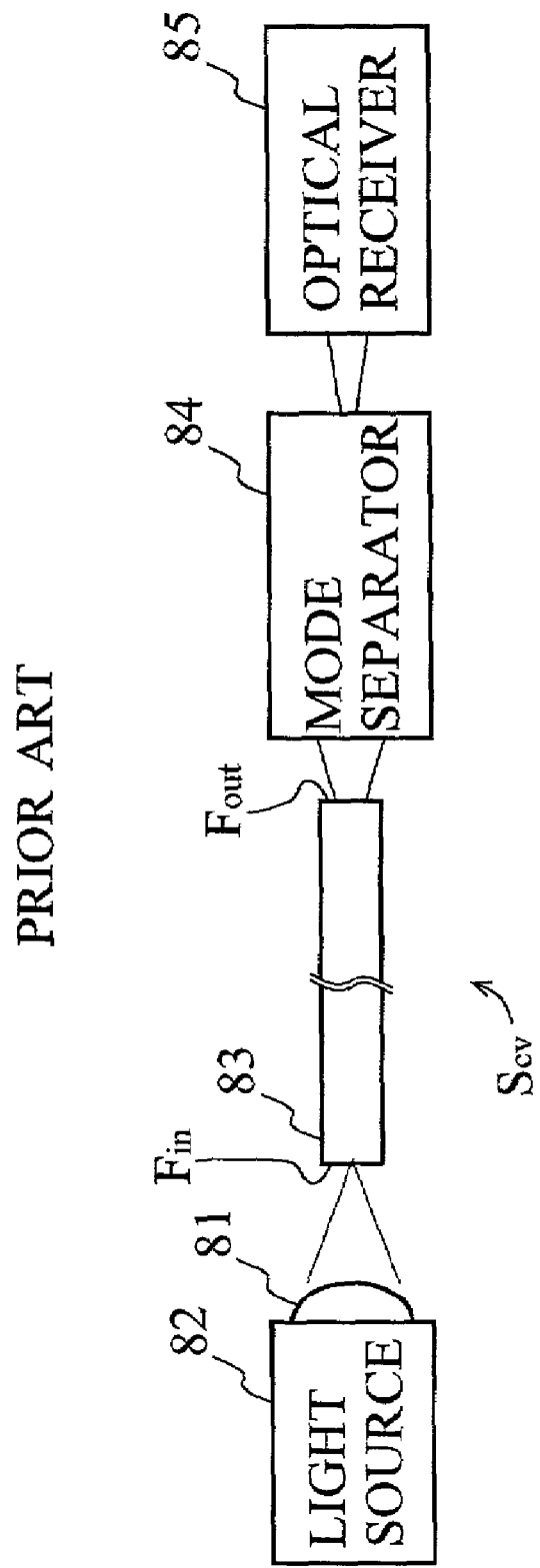
FIG. 13 is a block diagram illustrating the overall structure of a conventional optical transmission system $S_{cv}$.

The smaller the outgoing angle of a given mode in the optical signal $OS_{out2}$ outputted from the MMF 12, the lower the order of the mode. Therefore, by setting the light-receiving plane $F_{PD2}$ at the distance $Z_2$ from the output plane $F_{out}$ along the fiber axis $A_{fr}$, the light receiving element 222 can selectively receive the lower-order mode $M_{LO}$ while avoiding the higher-order mode $M_{HI}$. Thus, according to the present embodiment, without requiring a mode separator 84 as shown in FIG. 13, the influence of mode dispersion in the MMF 12 can be reduced by simply adjusting the position $Z_2$, and the transmission bandwidth of the MMF 12 can be broadened. As a result, a low-cost optical transmission system $S_b$ with a broad transmission bandwidth can be provided.

On the other hand, in the case where $S(Z_2)$ is smaller than $S_{PD}$, all of the modes contained in the optical signal $OS_{out2}$ outputted from the MMF 12 will enter the light-receiving plane FDP2. In other words, $NA_{PD}(Z_2)$ takes the same value as $NA_{out}$, as expressed by equation (10) below:

$$NA_{PD}(Z_2) = \sin\gamma_{th} = NA_{out}; S(Z_2) < S_{PD} \quad (10)$$

Note that $S(Z_2)$ being smaller than $S_{PD}$ means that $\phi_{cr}$ is greater than $\phi_{PD}$ and that the light-receiving plane $F_{PD2}$ is in proximity of the output plane $F_{out}$. Moreover, in this case, the light receiving element 222 cannot selectively receive only the lower-order mode $M_{LO}$. This fact also rationalizes the need for setting the light-receiving plane $F_{PD2}$ away from the output plane $F_{out}$.

In an actual implementation of the optical transmission system $S_b$, the determination of the distance $Z_2$ described above must be made while considering both the input power to the light-receiving plane $F_{PD2}$ and the eye opening factor of the optical signal $F_{out}$ entering the light-receiving plane $F_{PD2}$ as design requirements. The reason is that, as the influence of mode dispersion is reduced by increasing the value of $Z_2$, the coupling losses between the transmitter 11 and the MMF 12 increase, making it difficult to obtain the required input power P. Furthermore, the determination of the distance $Z_2$ described above must be made while considering the length $L_{fr}$ of the MMF 12 and the data rate of the optical signal $OS_{in}$, which are design requirements of the optical transmission system $S_b$. In other words, as the length $L_{fr}$ and the data rate become greater, the influence of mode dispersion becomes more outstanding, therefore requiring a greater $Z_2$ value.

(Third Embodiment)

Figure 11:
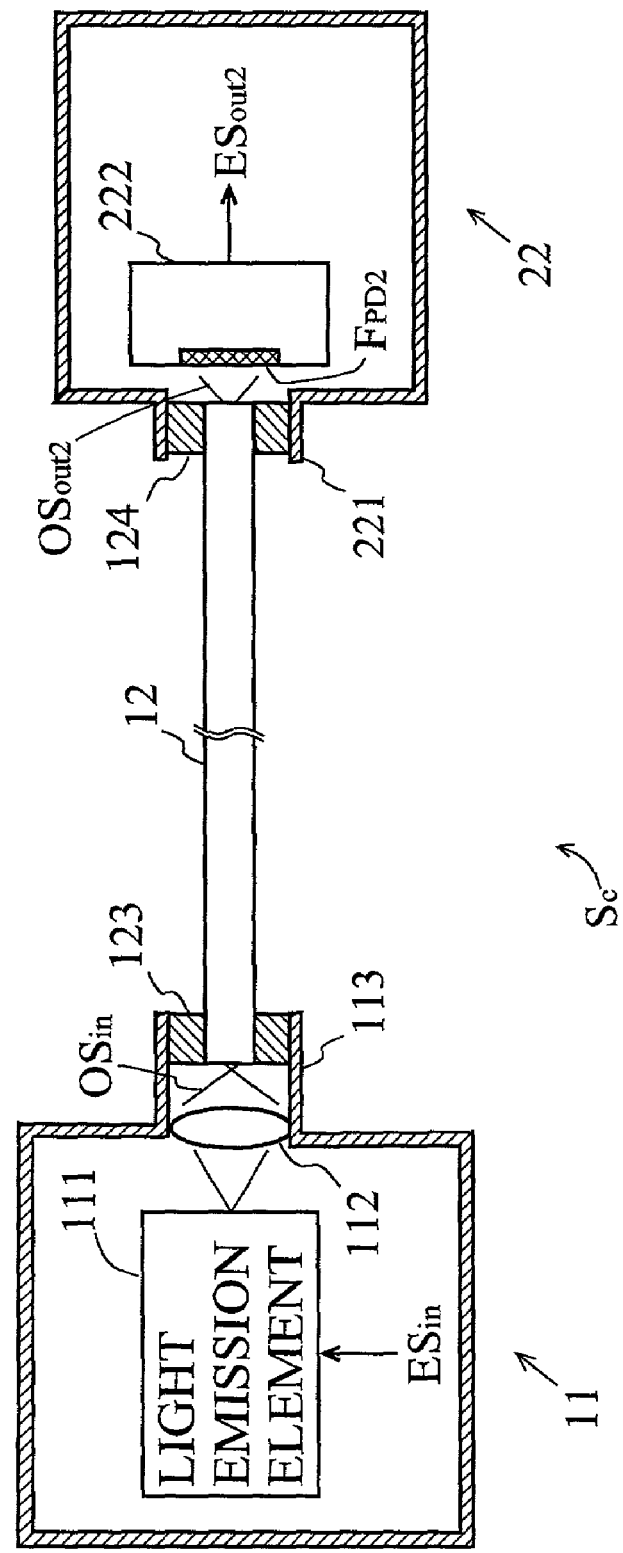
FIG. 11 is a block diagram illustrating the overall structure of an optical transmission system $S_c$ according to a third embodiment of the present invention.
Figure 12:
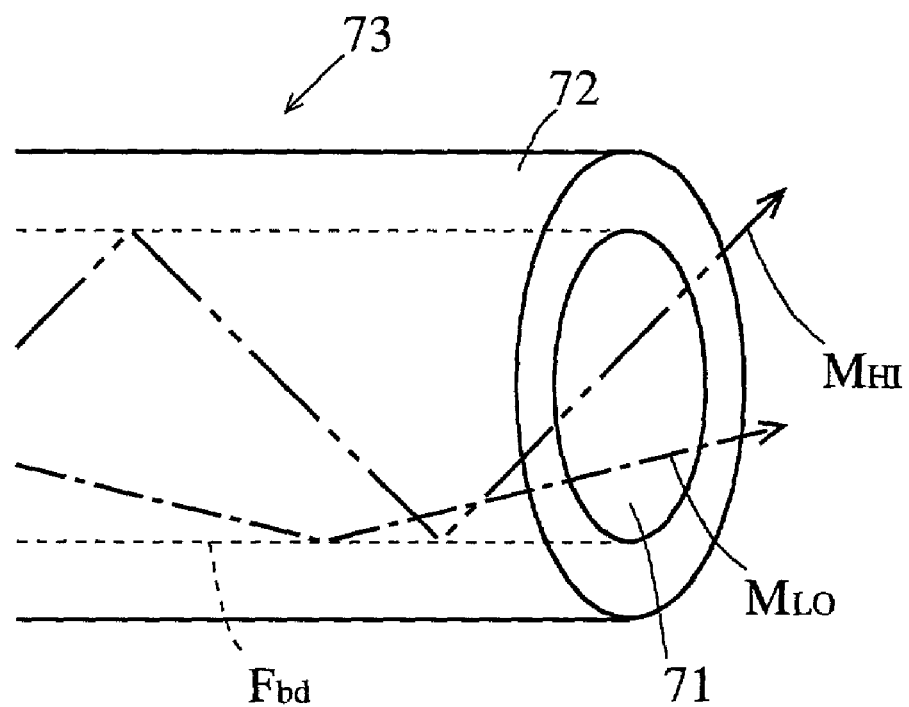
FIG. 12 is a schematic diagram illustrating general examples of a higher-order mode $M_{HI}$ and a lower-order mode $M_{LO}$.

FIG. 11 is a block diagram illustrating the overall structure of the optical transmission system $S_c$ according to a third embodiment of the present invention. In short, the optical transmission system $S_c$ shown in FIG. 11 combines the features of the first and second embodiments, and comprises the transmitter 11, the MMF 12, and the receiver 22. Accordingly, any component elements in FIG. 11 which find their counterparts in FIGS. 1 or 7 will be denoted by the same reference numerals as those used therein, in order to simplify description.

As shown in FIG. 11, the connector plug 123 is fitted into the receptacle 113 of the transmitter 11. As a result, as described with reference to FIG. 2, the fiber axis $A_{fr}$ of the MMF 12 and the optical axis $A_{lz}$ of the lens 112 are aligned, and the input plane $F_{in}$ of the core 121 is positioned at a predetermined distance $Z_1$ from the vertex $Z_0$ of the lens 112. The distance $Z_1$ is set at a value which is not equal to the distance from the vertex $Z_0$ to the focal point $Z_{fp}$, and preferably set at a value greater than the distance from the vertex $Z_0$ to the focal point $Z_{fp}$.

The connector plug 124 which is affixed to the MMF 12 is fitted into the receptacle 221. As a result, as described with reference to FIG. 8, the light-receiving plane $F_{PD2}$ opposes the output plane $F_{out}$ of the MMF 12 with a distance $Z_2$ therefrom. Furthermore, the central axis $A_{PD}$ of the light-receiving plane $F_{PD2}$ is aligned with the fiber axis $A_{fr}$.

In the optical transmission system $S_c$ as described above, the optical signal $OS_{out2}$ from the MMF 12 is substantially free from the influence of mode dispersion because the input plane $F_{in}$ is positioned at the distance $Z_1$ from the vertex $Z_0$. Even if there is any influence of mode dispersion, only the lower-order mode $M_{LO}$ of the optical signal $OS_{out2}$ is selectively received because the light-receiving plane $F_{PD2}$ is positioned at the distance $Z_2$ from the output plane $F_{out}$. Therefore, the optical transmission system $S_c$ is capable of further reducing mode dispersion in the MMF 12 as compared to the optical transmission systems $S_a$ and $S_b$, while eliminating the need for a mode separator 84 (see FIG. 13). Thus, a lower-cost and more broadband-oriented optical transmission system $S_c$ can be provided.

While the invention has been described in detail, the foregoing description is in all aspects illustrative and not restrictive. It is understood that numerous other modifications and variations can be devised without departing from the scope of the invention.

What is claimed is:

1. An optical transmission system comprising:
a transmitter for transmitting an optical signal toward a multi-mode fiber having an input plane with a core diameter, said transmitter including:
a light emission element for generating an optical signal; and
at least one lens having an optical axis and a vertex for converging the optical signal generated by said light emission element, wherein
the optical signal converged by said at least one lens enters the input plane of the multi-mode fiber to propagate through the multi-mode fiber,
the optical axis is aligned with a fiber axis of the multi-mode fiber,
the vertex is located at a predetermined distance from the input plane of the multi-mode fiber,
the predetermined distance is greater or less than a distance from the vertex to a focal point of said at least one lens,
an incident light propagation cross-section of the optical signal is defined in a plane perpendicular to the optical axis at the predetermined distance from the vertex, and
a distance between the focal point and the input plane is such that the incident light propagation cross-section is greater than a core cross-section defined by the core diameter at the input plane; and
a receiver including a light receiving element for receiving the optical signal outputted from the multi-mode fiber.

2. The optical transmission system according to claim 1, wherein the input plane of the multi-mode fiber is placed at a position farther away from said at least one lens than the focal point of said at least one lens.

3. A transmitter for outputting an optical signal toward a multi-mode fiber having an input plane with a core diameter, the transmitter comprising:
a light emission element for generating an optical signal; and
at least one lens having an optical axis and a vertex for converging the optical signal generated by said light emission element, wherein
the optical signal converged by said at least one lens enters the input plane of the multi-mode fiber to propagate through the multi-mode fiber,
the optical axis is aligned with a fiber axis of the multi-mode fiber,
the vertex is located at a predetermined distance from the input plane of the multi-mode fiber,
the predetermined distance is greater or less than a distance from the vertex to a focal point of said at least one lens,
an incident light propagation cross-section of the optical signal is defined in a plane perpendicular to the optical axis at the predetermined distance from the vertex, and
a distance between the focal point and the input plane is such that the incident light propagation cross-section is greater than a core cross-section defined by the core diameter at the input plane.

4. The transmitter according to claim 3, wherein the input plane of the multi-mode fiber is placed at a position farther away from said at least one lens than the focal point of said at least one lens.

5. The transmitter according to claim 3, further comprising a receptacle for connecting to the multi-mode fiber to affix the input plane of the multi-mode fiber at a position other than the focal point of said at least one lens.

6. An optical transmission system comprising:
a transmitter for transmitting an optical signal through a multi-mode fiber including:
a light emission element for generating an optical signal; and
at least one lens having an optical axis and a vertex for converging the optical signal generated by said light emission element,
wherein the optical signal converged by said at least one lens enters an input plane of the multi-mode fiber, propagates through the multi-mode fiber, and is outputted from an output plane of the multi-mode fiber; and
a receiver including:
a light receiving element having a light-receiving plane for receiving the optical signal from the output plane of the multi-mode fiber; and
a receptacle for connecting to the multi-mode fiber to affix the output plane of the multi-mode fiber at a predetermined distance from the light-receiving plane, wherein
said light receiving element receives a lower order mode of the optical signal and a higher order mode is prevented from entering the light-receiving plane of said light receiving element,
the predetermined distance is determined based on a core diameter of the multi-mode fiber, a diameter of the light-receiving plane, and a maximum angle among angles of modes of the optical signal outputted from the output plane of the multi-mode fiber which are capable of entering the light-receiving plane, so that a numerical aperture of the light-receiving plane is equal to or less than a given value, and
the given value is greater than zero and less than one.

7. The optical transmission system according to claim 6, wherein said light receiving element is a Si PIN photodiode.

8. A receiver for receiving an optical signal outputted from a multi-mode fiber, the receiver comprising:
a light receiving element having a light-receiving plane for receiving the optical signal from an output plane of the multi-mode fiber; and
a receptacle for connecting to the multi-mode fiber to affix the output plane of the multi-mode fiber at a predetermined distance from the light-receiving plane, wherein
said light receiving element receives a lower order mode of the optical signal and a higher order mode is prevented from entering the light-receiving plane of said light receiving element,
the predetermined distance is determined based on a core diameter of the multi-mode fiber, a diameter of the light-receiving plane, and a maximum angle among angles of modes of the optical signal outputted from the output plane of the multi-mode fiber which are capable of entering the light-receiving plane, so that a numerical aperture of the light-receiving plane is equal to or less than a given value, and
the given value is greater than zero and less than one.

9. An optical transmission system comprising:
a transmitter for transmission an optical signal through a multi-mode fiber, said transmitter including:
- a light emission element for generating an optical signal; and
- at least one lens having an optical axis and a vertex for converging the optical signal generated by said light emission element, wherein
- the optical signal converged by said at least one lens enters an input plane of the multi-mode fiber, propagates through the multi-mode fiber, and is outputted from an output plane of the multi-mode fiber,
- the optical axis is aligned with a fiber axis of the multi-mode fiber,
- the vertex is located at a first predetermined distance from the input plane of the multi-mode fiber,
- the first predetermined distance is greater or less than a distance from the vertex of said at least one lens to a focal point of said at least one lens, and
- the first predetermined distance is determined based on an eye opening factor of the multi-mode fiber and a power of the optical signal, so that a numerical aperture is equal to or less than a first given value and the power of the optical signal is equal to or greater than a second given value; and a receiver including:
- a light receiving element having a light-receiving plane for receiving the optical signal from the output plane of the multi-mode fiber; and
- a receptacle for connecting to the multi-mode fiber to affix the output plane of the multi-mode fiber at a second predetermined distance from the light-receiving plane, wherein
  - said light receiving element receives a lower order mode of the optical signal and a higher order mode is prevented from entering the light-receiving plane of said light receiving element,
- the second predetermined distance is determined based on a core diameter of the multi-mode fiber, a diameter of the light-receiving plane, and a maximum angle among angles of modes of the optical signal outputted from the output plane of the multi-mode fiber which are capable of entering the light-receiving plane, so that a numerical aperture of the light-receiving plane is equal to or less than a third given value,
  - the first and third given values are greater than zero and less than one, and
  - the second given value is greater than zero.

10. The optical transmission system according to claim 9, wherein the input plane of the multi-mode fiber is placed at a position farther away from a vertex of said at least one lens than the focal point of said at least one lens.

11. The optical transmission system according to claim 9, wherein said light receiving element is a Si PIN photodiode.

* * * * *